United States Patent [19]
Johnson et al.

[11] 3,782,892
[45] Jan. 1, 1974

[54] OVENS

[75] Inventors: David E. Johnson, Minneapolis;
Terrance E. Polsfuss, Clear Lake,
both of Minn.

[73] Assignee: Despatch Industries, Inc.,
Minneapolis, Minn.

[22] Filed: May 19, 1972

[21] Appl. No.: 255,226

[52] U.S. Cl................. 432/132, 126/21 A, 432/142
[51] Int. Cl............................................. F26b 9/24
[58] Field of Search........................ 432/142, 132; 126/21 A

[56] References Cited
UNITED STATES PATENTS

| | | | |
|---|---|---|---|
| 2,007,619 | 7/1935 | Staniford et al. | 432/142 |
| 3,537,405 | 11/1970 | Verhoeven | 432/142 |
| 3,439,665 | 4/1969 | Stromqvist | 126/21 A |

*Primary Examiner*—John J. Camby
*Attorney*—Frederick E. Lange et al.

[57] ABSTRACT

An improved oven includes an oven chamber, at least one baking shelf in the oven chamber for supporting products to be baked, and at least one wall member defining a shelf-heating compartment or duct extending through the oven chamber below the baking shelf. A supply conduit from a heater chamber outside the oven chamber delivers heated gaseous fluid to each shelf-heating compartment, and a return conduit connects each shelf-heating compartment to the heater chamber for recirculation of fluids with the aid of a heating blower to maintain the desired surface temperature for each baking shelf.

A preferred oven includes a plurality of rotary baking shelves supported in an oven chamber for rotation on a vertical axis. A transverse horizontal shelf wall extends across the oven chamber circumferentially around each baking shelf, and the shelf wall and rotary baking shelf cooperate to provide a substantially imperforate partition between a baking compartment above each rotary baking shelf and a shelf-heating compartment below each baking shelf.

The oven further includes an unobstructed delivery opening for each baking compartment for loading and removal of products at any time during continuous operation of the oven. Additional supply connections, conduits, adjustable valve members and an auxiliary blower are disclosed for selective delivery of some heated gaseous fluids from the heater chamber to each baking compartment, for selective adjustment of the relative rates of delivery of the heated fluid to the respective baking and shelf-heating compartments, for adjustably venting each baking compartment to the outside air, for removal of air from an edge of the delivery opening, and for adjustably venting the heater chamber to the outside air. The delivery openings are located in a removable vertical section of the side wall, e.g. a front wall section, and the supply and return conduits between the heater chamber and oven chamber are located at opposite sides of the oven chamber for circulation of heated fluids across the oven generally parallel to the delivery openings.

21 Claims, 6 Drawing Figures

PATENTED JAN 1 1974

OVENS

BACKGROUND OF THE INVENTION

This invention relates to baking ovens and to improved features of construction and operation of such ovens. Rotary ovens are known in which at least one horizontal rotary baking shelf is supported in an oven chamber for rotation on a vertical axis. Such ovens are customarily provided with a loading door or peel door, which can be opened to insert products to be baked, and which is then closed during the baking operation and reopened when it is time to remove the baked products. Such ovens have been operated on a continuous basis and it has been suggested that a movable door member could even be omitted.

From a commercial standpoint, however, the increasing emphasis on franchised food service operations, and particularly the popularity of such products as freshly cooked pizzas, have established a need for improved oven arrangements or reasonably economical construction, which can provide a variety of baking conditions without the extreme bulk and expense of installation which has previously been considered necessary for a successful commercial baking operation.

SUMMARY OF THE INVENTION

According to the present invention, an improved oven construction has at least one horizontal baking shelf located in an oven chamber for supporting products to be baked. Thus the oven chamber is divided into a baking compartment above each baking shelf and a shelf-heating compartment or heating duct below each baking shelf. A supply conduit connects a separate heater chamber to each shelf-heating compartment for delivery of heated gaseous fluids primarily to such shelf-heating compartments, the baking shelf serves as a top wall of the heating duct, and a return conduit connects each such shelf-heating compartment to the heater chamber for recirculation and further heating of the fluids to the extent necessary to establish a desired surface heat for each such baking shelf. A heating blower maintains the desired rate of fluid flow to heat the baking shelf, and a portion of the oven chamber wall has an unobstructed delivery opening of limited size which communicates with each baking compartment, but not with the shelf-heating compartments. Thus products may be loaded into and removed from each baking shelf at any time during operation of the oven.

A preferred oven includes a plurality of rotary baking shelves supported for rotation on a vertical axis, and a transverse horizontal shelf wall extending across the oven chamber circumferentially around each baking shelf, with the shelf wall and baking shelf cooperating with each other to provide a substantially imperforate partition dividing the oven into the desired compartments. Thus the cooperation of each shelf wall with its corresponding baking shelf substantially prevents the escape or discharge of heated gaseous fluids from any shelf heating compartment through a delivery opening.

The invention preferably also includes a supply connection for selective delivery of some of the heated gaseous fluid from the heater chamber to each baking compartment, with at least one controlling member for selective adjustment of the relative rates of delivery of heated fluids to the respective baking and shelf-heating compartments. In the preferred form of the invention, a plurality of such controlling members are provided, including an auxiliary blower connected through a venting conduit to each baking compartment for maintaining a desired rate of flow out of such compartment and thereby establishing a different temperature in the baking compartment from that established in the shelf-heating compartment below the corresponding baking shelf. Adjustable inlet and outlet openings for the heated fluid entering and leaving each of the baking and shelf-heating compartments furthr provide for adjustment of the relative heating affects, and the effective operation of each unobstructed delivery opening is enhanced by the provision of an air-removal conduit with a bleed opening at an edge, preferably the upper edge, of each such delivery opening and by the connection of such air-removal conduits to an exhaust outlet by means of the auxiliary blower, with adjustable means for varying the fluid flow through the air removal conduit. A further exhaust conduit, with an adjustable valve therein is preferably connected between the heater chamber and the exhaust outlet, by means of the same auxiliary blower, thereby achieving complete flexibility of adjustment in the respective rates of delivery of heated gaseous fluid to the various compartments, in the re-circulation of heated fluid to the heater chamber from each shelf-heating compartment, and in the venting or removal of heated gaseous fluid from each baking compartment, as well as from the heater chamber and the vicinity of each auxiliary opening. Transverse partition walls are provided above each baking compartment to provide a convenient multiple shelf oven in which such a partition wall can serve both as the top wall of a lower baking compartment and as the bottom wall of the next higher shelf heating compartment. Such a common partition wall includes an adjustable valve member for supplying a selective proportion of heated gaseous fluid from an upper shelf-heating compartment to the next lower baking compartment.

BRIEF DESCRIPTION OF THE DRAWINGS

In the drawings which accompany and form a part of this application.

DESCRIPTION OF THE PREFERRED EMBODIMENT

Figure 1:
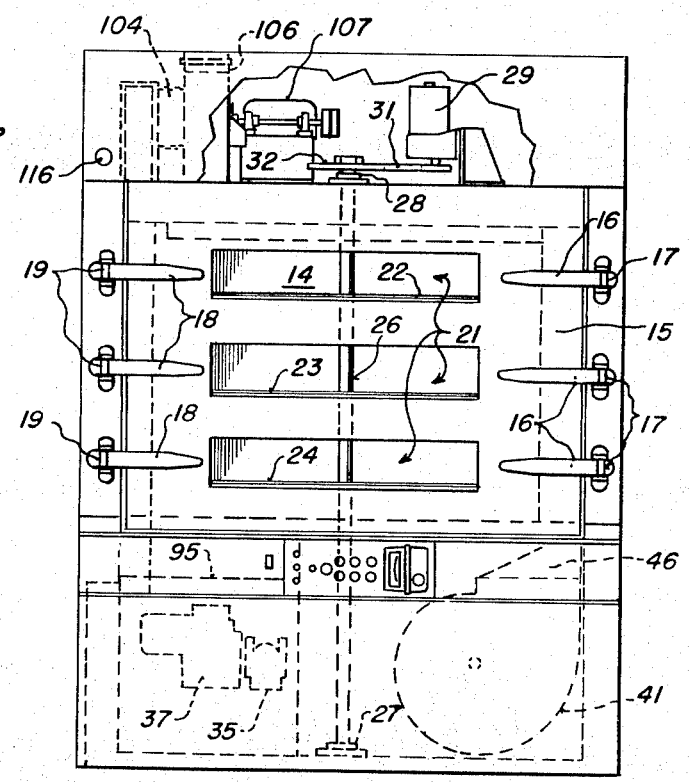
FIG. 1 is a front elevation of an improved rotary oven according to the invention.
Figure 3:
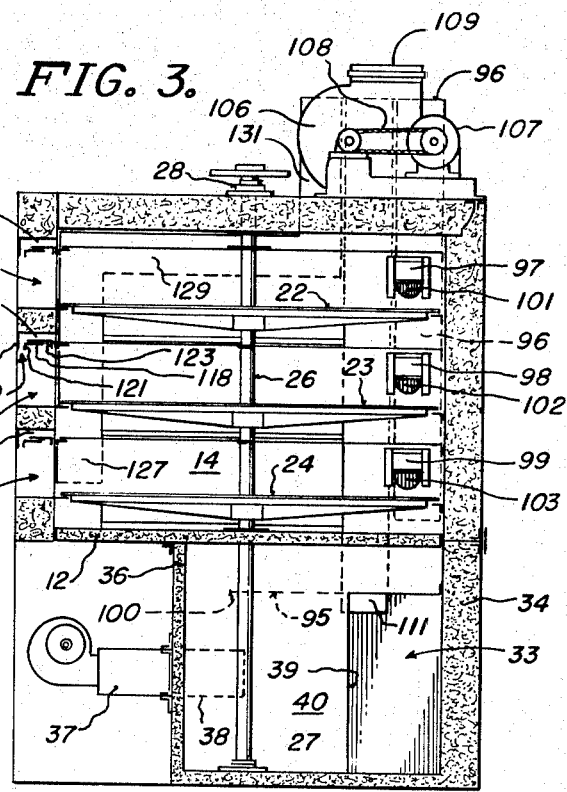
FIG. 3 is a sectional view on the line 3—3 of FIG. 2.

As shown in FIGS. 1 and 3, the improved rotary oven 10 according to the preferred form of the invention includes top and bottom walls 11 and 12 respectively, in combination with one or more side walls 13, all of which are of double wall or insulated construction and which surround and enclose an oven chamber 14 of the desired total size. The term "side wall" is used herein for convenience as including either a single circumferential side wall which completely surrounds the oven chamber or a plurality of angularly related side walls, such as the more usual front, back, and left and right side walls.

Figure 2:
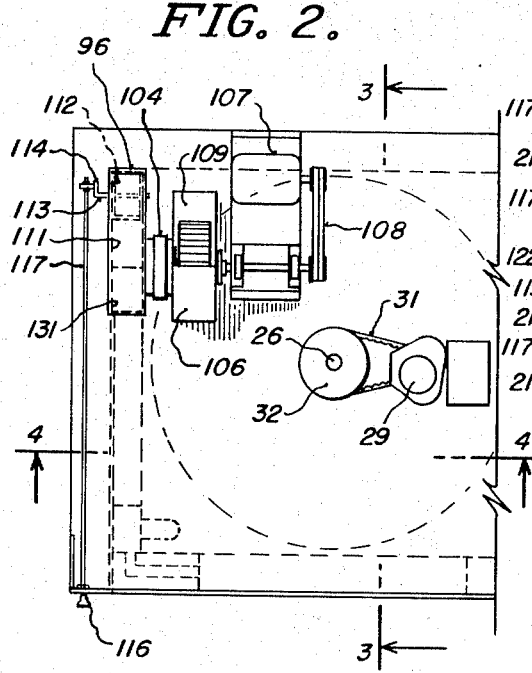
FIG. 2 is a partial top plan view of the oven of FIG. 1.

In the present case, the oven walls are of rectangular configuration as viewed in FIG. 2, and the major portion 15 of the front wall is completely removable from the front of the oven chamber, whenever access is required for cleaning or maintenance of the oven. For this purpose, the front wall section 15 has a plurality of hinges 16 connecting its right edge (as viewed in FIG. 1) to the adjacent side wall portion 13. Hinges 16 have manually removable hinge pins 17.

Similarly, the left edge of removable section 15 is secured by similar hinge members 18, with removable hinge pins 19, to the side wall portion at the left side of this section. Thus, depending on the particular location in which the oven is installed, it is possible to remove all of the hinge pins 17 and swing the front section 15 outwardly and to the left in FIG. 1 or, alternately, remove only the hinge pins 19 and swing the left edge of section 15 outwardly to the right in FIG. 1. By removal of all the hinge pins 17 and 19, section 15 can be removed completely.

In order to provide continuous access to the oven chamber 14 at all times during normal operation, unobstructed delivery openings 21 are located in one side wall portion of oven 10. In this case the delivery openings are specifically located in the removable front section 15.

As shown particularly in FIG. 3, the oven chamber 14 has mounted within it a series of vertically spaced, horizontally extending rotary baking shelves 22, 23 and 24. These baking shelves are fixed to a vertically extending rotary shaft 26, which is supported in bearings 27 and 28 at the bottom and top of the oven (FIG. 1). An electric drive motor 29, with associated reduction gearing, has its driving pulley connected by a belt 31 to pulley 32 keyed to the upper end of shaft 26. Thus operation of motor 29 results in rotary movement of the shaft 26 and the respective baking shelves around the vertical axis of the shaft within the oven.

To supply the desired heated gaseous fluid to selected portions of the oven chambers, a separate heater chamber 33 (FIGS. 3 and 5) is located outside the oven chamber and provided with appropriate conduits for circulation of the heated gas. In this case the heater chamber 33 is located at the rear of the complete oven assembly below the bottom wall 12 of the oven chamber, and between the rear wall portion 34 and an intermediate vertical partition 36 on which parts of a suitable heater unit and heating blower assembly may be mounted. Any standard type of oven heating unit may be utilized. For purposes of illustration, a gas burner unit 37 is supported in the compartment at the front of partition wall 36 near the bottom of the oven. Burner 37 extends through the partition wall 36 and combustion occurs at that portion of the burner indicated at 38 within the heater chamber 33. Gas reaches the burner through pipe 30, and air for combustion is drawn through the usual adjustable combustion blower. Damper 35 is an adjustable air inlet for pressure control in heater chamber 33.

The heated gaseous products of combustion, and the air in the heater chamber which is further heated by such products, are drawn around edge 39 of partition 40 to inlet 45 of a heater blower 41, The heater blower is in the heater compartment and is driven by a motor 42 near the bottom of the oven in the front compartment which is separated from the heater chamber 33 by intermediate partition 36. Motor 42 has its drive pulley connected by belt 43 to a driven pulley on the blower shaft 44. Heated gas from the blower is discharged through its outlet 46 onto a supply conduit generally indicated at 47 (FIG. 4) which extends upwardly just inside the right side wall 13 of the oven chamber. Supply conduit 47 preferably extends all the way from the front to the rear of the oven and includes an inclined partition or air supply plenum 48 which also extends from front to rear and is inclined as shown to divide the entire conduit 47 into a right-hand portion 49 which directs the heated gaseous fluid upwardly from the blower to the top of the conduit 47, and a downwardly inclined or left-hand portion 51 through which the heated gas moves back downwardly to the desired oven compartments. The inclination of the partition 48 upwardly and to the right insures even distribution of the heated gaseous fluid from front to rear of the oven throughout the upper portion of the supply conduit and the return portion 51.

Figure 4:
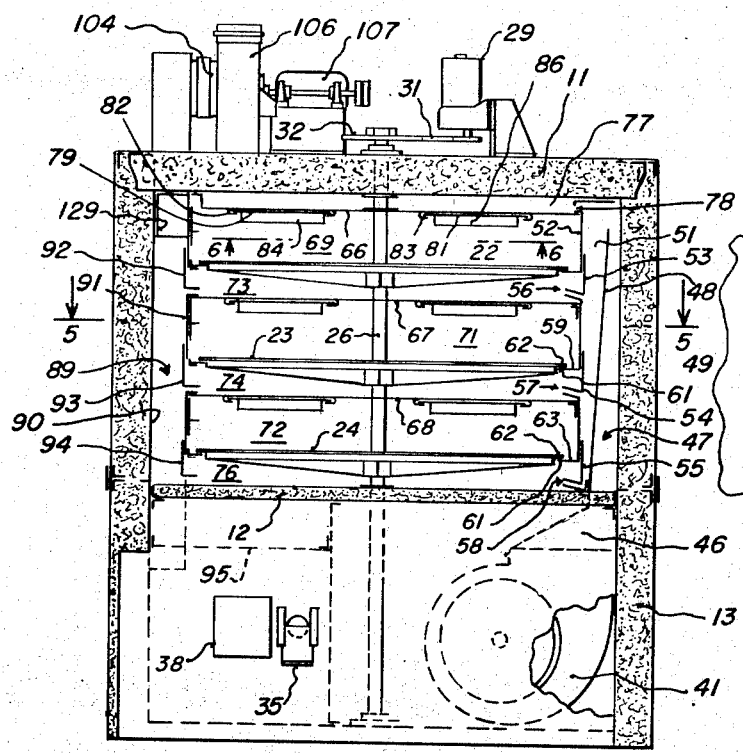
FIG. 4 is a sectional view of the complete oven taking on the line 4—4 of FIG. 2, with certain portions omitted for clarity.

As shown in FIG. 4, the left wall 52 of the supply conduit 47, 49, 51 extends vertically of the oven and from front to back and is provided with adjustable valve members for discharging heated gaseous fluid at selective volume rates primarily to the oven chamber portions immediately below each baking shelf. Thus vertically adjustable slides 53, 54 and 55 are provided at their lower edges with flanges which define the upper edge of supply conduit slots or valves 56, 57 and 58 respectively. Vertical adjustment of the individual slides 53, 54 and 55 can accordingly control the relative proportions of heated gaseous fluid fed into the oven chamber below each of the respective shelves 22, 23 and 24.

According to one version of the present invention, the oven chamber is provided with a transverse horizontal shelf wall extending entirely across the oven chamber circumferentially around each baking shelf. Each shelf wall and its rotary baking shelf cooperate with each other to provide a substantially imperforate partition dividing the oven into compartments, i.e., a baking compartment above each baking shelf and a shelf-heating compartment below each baking shelf.

Figure 5:
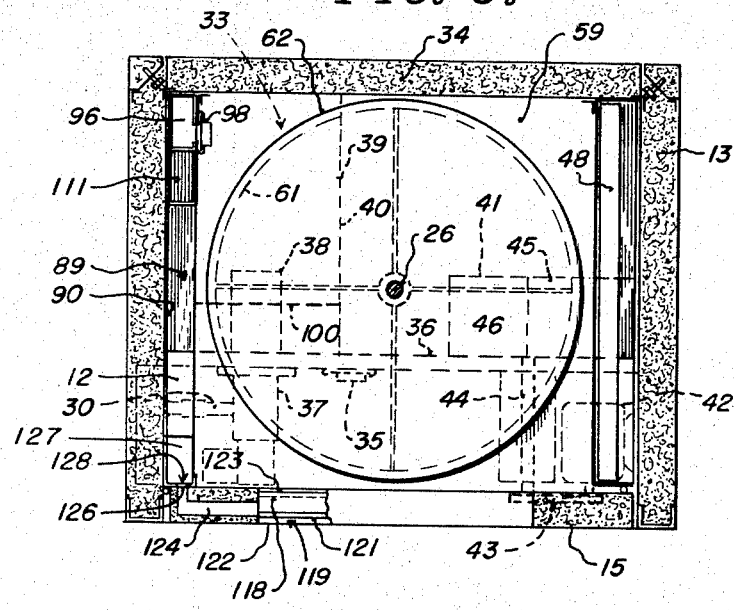
FIG. 5 is a sectional view on the line 5—5 of FIG. 4.

Thus, as shown in FIGS. 4 and 5, the baking shelf 23 cooperates with a horizontal shelf wall 59 which extends entirely across the oven chamber around the circumference of rotary shelf 23. This shelf wall and the rotary baking shelf are provided with circumferential edges which cooperate in a manner to minimize or substantially eliminate the flow of heated gas from the compartment below each baking shelf to the compartment above it. For this purpose, the outer edge 62 of rotary shelf 23 extends outwardly slightly beyond and above the inner circumferential edge 61 of shelf 59. A similar horizontal shelf wall 63 operates with the lower baking shelf 24, and a transverse shelf wall 64 likewise cooperates with the upper baking shelf 22.

To further provide the desired selective control of the relative heating effects above and below each baking shelf, the oven chamber is also provided with a transverse horizontal partition wall extending entirely across the oven chamber at a desired distance above each baking shelf. Thus in FIG. 4, transverse partition walls 66, 67 and 68 are located above the respective baking shelves 22, 23 and 24, thereby defining respective baking compartments 69, 71 and 72 above the respective rotary shelves. The lower transverse partition walls 67 and 68 also serve the additional function of providing respective bottom walls for the shelf-heating compartments 73 and 74 below the respective upper baking shelves 22 and 23. A similar shelf-heating compartment 76 is provided below the lower baking shelf 24, with its lower wall provided by the lower oven wall 12 itself.

The upper transverse partition wall 66 is spaced slightly below the top wall 11 of the oven chamber and thus provides a further supply conduit area 77 above partition 66. Heated gaseous fluid is fed to this additional supply conduit portion 77 through a slot 78 at the top of wall 52 of the supply conduit 47, 49, 51.

Figure 6:
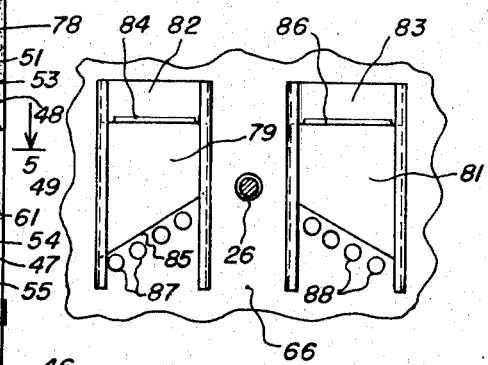
FIG. 6 is a bottom view on the line 6—6 of FIG. 4 showing details of the adjustable valve members for delivery of heated gaseous fluid to one of the baking compartments through a transverse partition wall.

The described construction thus provides a supply of heated gaseous fluid above each of the partition walls at the top of each baking chamber, and it will be understood that the supply of heated gaseous fluid above the partitions 67 and 68 is actually provided by the heated gas supplied to the corresponding shelf-heating compartments 73 and 74 of the next higher baking shelves. To complete the supply connections for selective delivery of some of the heated gaseous fluid from the heater chamber to each baking compartment, controlling members are provided in the form of supply valve members shown at 79 and 81 in FIGS. 4 and 6, as applied to the transverse partition wall 66 above the upper baking compartment 69. Thus adjustable valve slides 79 and 81 are movably supported in guides 82 and 83 respectively, and are provided with flanges 84 and 86 for manual adjustment of the respective slide positions with respect to valve openings 87 and 88 in the transverse partition wall 66. As shown in FIG. 6, the slides have inclined edges 85, and longitudinal movement of each of the slides 79 and 81 can gradually open or close all of the corresponding valve openings 87 and 88 to provide a selective uniform flow of heated gaseous fluid to the upper baking compartment 69. Similar valve members on the partition walls 67 and 68 provide for diversion of selected portions of the heated gaseous fluid from the supply conduit portion 51 through the shelf-heating compartments 73 and 74 to the respective baking compartments 71 and 72.

The oven also includes a return conduit 89 between oven chamber side wall 90 and inner wall 91 for recirculation of heated gaseous fluid from the respective shelf-heating compartments to the heater chamber 33. For selective adjustment of the relative return rates, the wall 91 of return conduit 89 (FIG. 4) is also provided with vertically adjustable slide members 92, 93 and 94 to provide adjustable exhaust slots from the left ends of the respective shelf-heating chambers 73, 74 and 76. The lower end of return conduit 89 communicates with the heater chamber 33, through the space between horizontal plate 95 and the bottom wall 12 of the oven chamber and through the opening between the intermediate partition wall 36 and the edge 100 of plate 95 (as shown in FIGS. 3 and 4), where the recirculated fluid is directed to the vicinity of the burner 38 for reheating and is then recirculated to the supply conduit 47 by means of blower 41. Thus, during operation of the oven, there is a constant forced circulation of heated and reheated gaseous fluid from the heater chamber to the shelf-heating chambers and back to the heater chamber, to insure the maintenance of the desired high temperature or surface heat for the rotary baking shelves 22, 23 and 24.

In order to provide selective removal of a desired portion of heated gaseous fluid from each of the baking compartments above the respective baking shelves, a venting conduit 96 (FIGS. 3 and 5) extends vertically at the left rear corner of the oven chamber and is provided with adjustable exhaust valve members 97, 98 and 99 for controlling the exhaust of heated fluid through the exhaust valve openings 101, 102 and 103 of the respective baking compartments 69, 71 and 72.

The upper end of venting conduit 96 is connected to the inlet housing 104 of an auxiliary blower 106 mounted on the top of the oven. The auxiliary blower is driven by a motor 107 by the usual belt connection 108. The discharge of the blower is delivered through an exhaust outlet 109 which is suitably vented to the outside air, for example by means of a suitable chimney or other adequately insulated exhaust outlet (not shown).

An adjustable flap valve 112 is supported on a transverse axis at 113 within venting conduit 96 and is controlled by a lever arm 114 connected to an operating handle 116 at the front of the oven by a link 117 (FIG. 2). Thus the venting conduit can be essentially closed when it is desired to maintain high heat in the baking compartments. Alternately, venting conduit 96 may be selectively opened to a desired degree to vent a portion of the heated gaseous fluid from the baking compartments.

In order to be able to exhaust predetermined portions of the heated gaseous fluid from the heater chamber 33 to the exhaust outlet 109, an exhaust conduit 111 extends vertically as shown in FIGS. 2 and 3 from the heater compartment 33 to the inlet housing 104 of the auxiliary blower 106. The exhaust conduit 111 is designed for removal of a desired portion of heated gaseous fluid from the heater chamber at a rate corresponding to the rate of formation of combustion products by the gas burner. In the preferred form, during operation of the described oven, the circulation of heated fluid through the supply and return conduits is approximately 1,500 to 2,000 c.f.m. (cubic feet per minute), and the rate of flow through exhaust conduit 111 is approximately 50 s.c.f.m. (i.e. standard cubic feet per minute). Thus most, but not all, of the heated fluid is recirculated.

According to a further feature of the preferred form of the invention, an air removal conduit is associated with each of the constantly open delivery openings 21 for the respective baking compartments. Thus, as shown particularly in FIGS. 3 and 5, an air removal conduit 117 is associated with the upper edge of each delivery opening 21 and extends laterally across the entire top edge of such opening. A movable slide 118 on the lower wall of conduit 117 can be adjusted toward and away from the oven chamber to provide a bleed slot 119 extending across the front upper edge of each door opening between a depending flange 121 on adjustable slide 118 and a shielding flange 122 projecting downwardly from the upper edge of the delivery opening between the bleed opening and the space outside the oven. A second shielding flange 123 is located between the bleed opening and the baking compartment and also projects downwardly from the upper edge of the delivery opening. These shielding flanges assist in preventing the undesired escape of heated gaseous fluid from each baking compartment, even though the delivery openings are constantly open during normal operation of the oven. To bleed the desired amount of air through bleed slot 119 and air removal conduits 117, each of these conduits is provided with a connecting passage 124 (FIG. 5) which extends to an opening 126 in the rear wall of the removable front wall section 15. A main air removal conduit 127 extends vertically at the front left corner of the oven (FIGS. 2, 3 and 5) and includes mating openings 128 which are connected in face to face relation to the openings 126 when the front wall portion 15 is mounted on the oven. Main air removal conduit 127 extends from front to rear at the top of the oven as shown at 129 and then has an upward extension 131 which is also connected to the inlet housing 104 of auxiliary blower 106. Thus selective volume rates of air can be removed from the upper edge of each delivery opening to provide the desired air curtain effect and minimize unwanted escape of heated fluid to the area in front of the oven where it could cause discomfort to an operator.

The preferred embodiment of the present invention thus provides a very high degree of flexibility and selectivity in the adjustment of relative heating effects above and below a heated baking shelf in an oven which has unobstructed delivery openings for the insertion and removal of food products at irregular schedules to meet the varying demands of a versatile commercial operation. According to the foregoing specification, the nature and background of this invention have been set forth, and some of the ways of practicing the invention have been described, including the preferred embodiment presently contemplated as the best mode for carrying out such invention.

We claim:

1. In a rotary oven having side, bottom and top walls enclosing an oven chamber, a heater chamber located outside said oven chamber and having a heater for supplying heated gaseous fluid to said oven chamber, at least one horizontal rotary baking shelf in said oven chamber supported for rotation on a vertical axis and means for rotating the baking shelf around said axis, the improvement comprising a transverse horizontal shelf wall extending across the oven chamber circumferentially around the baking shelf, the shelf wall and baking shelf cooperating with each other to provide a substantially imperforate partition dividing the oven into a baking compartment above the baking shelf and a shelf-heating compartment below the baking shelf, a supply conduit connecting the heater chamber to the shelf-heating compartment for delivery of heated gaseous fluid primarily to said shelf-heating compartment, and a return conduit connecting the shelf-heating compartment to the heater chamber for recirculation of such fluid back to said heater chamber for further heating, and a heating blower connected to one of said conduits for maintaining a desired rate of fluid flow therein to heat said baking shelf.

2. A rotary oven according to claim 1 in which a vertically extending portion of the oven chamber side wall has an unobstructed delivery opening of limited size which communicates only with the baking compartment, and through which products may be loaded onto and removed from said baking shelf at any time during operation of the oven, the cooperation of the shelf wall and baking shelf substantially preventing discharge of heated gaseous fluid from the shelf heating compartment to said delivery opening.

3. A rotary oven according to claim 2 having a supply connection for selective delivery of some of the heated gaseous fluid from the heater chamber to the baking compartment, and at least one controlling member for selective adjustment of the relative rates of delivery of the heated fluid to the respective baking and shelf-heating compartments.

4. A rotary oven according to claim 3 having a venting conduit connecting the baking compartment to the air outside the oven chamber, an auxiliary blower connected to the venting conduit for maintaining a desired rate of fluid flow out of the baking compartment, and an adjustable valve member for selectively adjusting the fluid flow through the venting conduit.

5. A rotary oven according to claim 4 having an air-removal conduit with a bleed opening at an edge of the delivery opening, the auxiliary blower being also connected to the air-removal conduit for maintaining a desired rate of fluid flow away from the delivery opening.

6. A rotary oven according to claim 5 in which the heater is a gas burner, the oven also having an exhaust conduit connected between said heater chamber and auxiliary blower for removal of a desired portion of heated gaseous fluid from the heater chamber through the auxiliary blower, at a rate corresponding to the rate of formation of combustion products by said gas burner.

7. A rotary oven according to claim 3 in which the supply conduit includes a supply valve member for selective delivery of heated gaseous fluid to one portion of the baking compartment above the baking shelf, and said oven also has an exhaust outlet, and a venting conduit connecting another portion of said baking compartment to the exhaust outlet.

8. A rotary oven according to claim 7 in which one controlling member comprises an auxiliary blower for maintaining a desired rate of fluid flow through the baking compartment.

9. A rotary oven according to claim 8 in which the auxiliary blower is connected to the venting conduit and exhaust outlet, the supply valve member is adjustable to vary the relative proportions of heated gaseous fluid delivery from the heater chamber to the respective baking and shelf-heating compartments, and the oven includes an adjustable venting valve member for adjusting the relative volume rate of fluid removal from the baking compartment through the venting conduit, blower and exhaust outlet.

10. A rotary oven according to claim 7 having a transverse horizontal partition wall extending across the oven chamber above the baking shelf and thereby providing a top wall for the baking compartment above the baking shelf, the supply conduit having a construction and location also delivering heated gaseous fluid to the oven chamber area immediately above the horizontal partition wall, and the supply valve member comprising at least one valve opening in the horizontal partition wall and an adjustable valve member movably mounted in the oven for selectively adjusting the effective area of said opening.

11. A rotary oven according to claim 10 having a plurality of said rotary baking shelves spaced vertically, within the oven chamber, a corresponding plurality of said transverse horizontal shelf walls, each of which cooperates with its corresponding rotary baking shelf to provide a substantially imperforate partition dividing the oven into a baking compartment above each baking shelf and a shelf-heating compartment below each baking shelf, a corresponding plurality of transverse horizontal partition walls, each of which provides a top wall for the baking compartment above the corresponding baking shelf, each such transverse horizontal partition wall below the uppermost rotary baking shelf also providing and serving as a bottom wall for the shelf heating compartment of the rotary baking shelf above it, the supply conduit delivering heated gaseous fluid to each of said shelf-heating compartments and also to the oven chamber area immediately above that transverse horizontal partition wall which provides a top wall for the baking compartment above the uppermost rotary baking shelf, each of said transverse horizontal partition walls having its own supply valve opening and individually adjustable valve member, said venting conduit being connected to each of the baking compartments, said oven, including separately adjustable venting valve members for individually controlling the relative flow of heated fluid from each such baking compartment through the venting conduit, and said oven having a corresponding plurality of unobstructed delivery openings, each of which communicates only with its corresponding baking compartment.

12. A rotary oven according to claim 11 having a plurality of air removal conduits, each of which has a bleed opening at an upper edge of the corresponding delivery opening, the discharge openings and air-removal conduits being located in a removable vertical section of the oven chamber wall, the oven having a common vertically extending air-removal conduit portion connected to the auxiliary blower and having an inlet opening corresponding to each of the air-removal conduits and located adjacent each such conduit when the removable wall section is in position as part of the oven chamber wall, each air-removal conduit in the removable wall section having an outlet opening located to engage the corresponding inlet opening of the common air-removal conduit when the removable wall section is in such position.

13. A rotary oven according to claim 2 having an air-removal conduit with a bleed opening at an edge of the delivery opening, an auxiliary blower connected to the air-removal conduit for maintaining a controlled rate of fluid flow away from the delivery opening through the air-removal conduit during operation of the oven, and air-removal adjusting means for modifying the rate of fluid flow through the air-removal conduit.

14. A rotary oven according to claim 13 in which the air-removal conduit extends across the upper edge of the delivery opening, the bleed opening is located at the bottom of the air-removal conduit, the oven includes at least one shielding flange projecting downwardly from the upper edge of the delivery opening adjacent the bleed opening, and the air-removal adjusting means includes means for adjusting the area of said bleed opening.

15. A rotary oven according to claim 14 in which the bleed opening consists of a slit extending substantially across the upper edge of the delivery opening, and said oven includes two shielding flanges projecting downwardly from said upper edge and also extending substantially across the upper edge, one shielding flange being located between the bleed opening and the baking compartment above the baking shelf, and the other shielding flange being located between the bleed opening and the space outside the oven.

16. A rotary oven according to claim 2 in which a section of the vertically-extending wall portion which has the delivery opening is readily removable from the oven for cleaning access to the oven, said oven including manually disengageable retaining means for removably retaining said section in its normal oven wall position.

17. A rotary oven according to claim 2 in which the retaining means includes hinge members with removable vertical hinge pins, at least one hinge member being connected at each side of said removable section for selective removal of the hinge pins at one side and swinging outward movement of the section on the hinge member at the opposite side.

18. In a rotary oven having side, bottom and top walls enclosing an oven chamber, a heater chamber located outside said oven chamber and having a heater for supplying heated gaseous fluid to said oven chamber, at least one horizontal rotary baking shelf in said oven chamber supported for rotation on a vertical axis and dividing the oven into a baking compartment above the baking shelf and a shelf-heating compartment below the baking shelf, and means for rotating the baking shelf around said axis, the improvement comprising a supply conduit connecting the heater chamber to the shelf-heating compartment for delivery of heated gaseous fluid primarily to said shelf-heating compartment, and a return conduit connecting the shelf-heating compartment to the heater chamber for recirculation of such fluid back to said heater chamber for further heating, and a heating blower connected to one of said conduits for maintaining a desired rate of fluid flow through the shelf-heating compartment to heat said baking shelf.

19. An oven according to claim 18, in which the baking shelf has a bottom surface which constitutes at least a portion of a top wall of the shelf-heating compartment, and the supply conduit and oven construction direct heated gaseous fluid into direct engagement with the bottom surface of the baking shelf.

20. In a rotary oven having walls enclosing an oven chamber, a heater chamber located outside the oven chamber and having a heater for supplying heated gaseous fluid to the oven chamber, at least one horizontal rotary baking shelf in the oven chamber supported for rotation on a vertical axis and dividing the oven chamber into a baking compartment above the baking shelf and a shelf-heating compartment below the baking shelf, and means for rotating the baking shelf around said axis, the improvement comprising a supply conduit connecting the heater chamber to the shelf-heating compartment for delivery of heated gaseous fluid to said shelf-heating compartment, a supply connection for selective delivery of some of the heated gaseous fluid from the heater chamber to the baking compartment, at least one controlling member for selective adjustment of the relative rates of delivery of the heated fluid to the respective baking and shelf-heating compartments, a return conduit connecting only the shelf-heating compartment to the heater chamber for recirculation of such fluid back to said heater chamber, a heating blower connected to one of said conduits for maintaining a desired rate of fluid flow through the shelf-heating compartment, a venting conduit directly connecting only the baking compartment to the air outside the oven chamber, an auxiliary blower connected to the venting conduit for maintaining a desired rate of fluid flow out of the baking compartment, and an adjustable valve member for selectively adjusting the fluid flow through the venting conduit.

21. In an oven having walls enclosing an oven chamber, and at least one baking shelf extending across the oven chamber for supporting products to be baked, the improvement in which a vertically extending oven chamber wall portion has an unobstructed delivery opening of limited size which communicates with the oven chamber above the baking shelf for insertion and removal of such products at any time during operation of the oven, and an air-removal conduit having at least one bleed opening positioned at an edge of the delivery opening and a blower connected to the air-removal conduit for maintaining a desired rate of fluid flow away from the edge of the unobstructed delivery opening during operation of the oven.

* * * * *